US011688027B2

(12) United States Patent
Huppe et al.

(10) Patent No.: US 11,688,027 B2
(45) Date of Patent: Jun. 27, 2023

(54) GENERATING ACTIONABLE INFORMATION FROM DOCUMENTS

(71) Applicant: Codexo, Paris (FR)

(72) Inventors: Sébastien Huppe, Paris (FR); Marc Dangeard, Toulon (FR)

(73) Assignee: CODEXO, Paris (FR)

( * ) Notice: Subject to any disclaimer, the term of this patent is extended or adjusted under 35 U.S.C. 154(b) by 552 days.

(21) Appl. No.: 16/825,729

(22) Filed: Mar. 20, 2020

(65) Prior Publication Data

US 2021/0295261 A1 Sep. 23, 2021

(51) Int. Cl.
G06Q 50/18 (2012.01)
G06F 16/93 (2019.01)
G06F 16/901 (2019.01)
G06F 40/117 (2020.01)
G06Q 40/08 (2012.01)
G06F 40/30 (2020.01)
G06F 40/289 (2020.01)

(52) U.S. Cl.
CPC ......... G06Q 50/18 (2013.01); G06F 16/9024 (2019.01); G06F 16/93 (2019.01); G06F 40/117 (2020.01); G06F 40/289 (2020.01); G06F 40/30 (2020.01); G06Q 40/08 (2013.01)

(58) Field of Classification Search
None
See application file for complete search history.

(56) References Cited

U.S. PATENT DOCUMENTS

| 7,047,491 | B2 * | 5/2006 | Schubert | G06Q 10/10 715/256 |
| 8,229,883 | B2 * | 7/2012 | Brauer | G06F 16/319 707/602 |
| 11,068,644 | B1 * | 7/2021 | Beiderman | G06F 40/174 |
| 11,158,012 | B1 * | 10/2021 | Rajpara | G06Q 50/18 |
| 11,410,184 | B2 * | 8/2022 | Marascu | G06F 40/40 |
| 2007/0300295 | A1 * | 12/2007 | Kwok | G06Q 10/10 726/10 |
| 2008/0235227 | A1 * | 9/2008 | Kwok | G06Q 10/10 |
| 2010/0268528 | A1 * | 10/2010 | Raskina | G06F 40/284 715/256 |
| 2011/0055206 | A1 * | 3/2011 | Martin | G06F 40/289 707/723 |
| 2014/0053069 | A1 * | 2/2014 | Yan | G06Q 10/0635 715/259 |
| 2014/0164388 | A1 * | 6/2014 | Zhang | G06F 16/93 707/742 |
| 2014/0280336 | A1 * | 9/2014 | Glover | G06F 16/93 707/771 |

(Continued)

Primary Examiner — Howard Cortes
(74) Attorney, Agent, or Firm — AMPACC Law Group, PLLC

(57) ABSTRACT

Systems and methods for creating actionable data from documents are described. In some implementations, the systems and methods deconstruct, or break up, documents into blocks (e.g., a paragraph or other segment or portion of text of the document) and store the blocks in a database. The systems and methods tag the blocks with intelligence about the content of the blocks. For example, the systems and methods can tag blocks with commitment markers or other information that identify the blocks as containing or reciting a commitment (e.g., a contractual provision, term, or obligation) within a contract document.

20 Claims, 11 Drawing Sheets

(56) References Cited

U.S. PATENT DOCUMENTS

| | | | |
|---|---|---|---|
| 2016/0232226 A1* | 8/2016 | McManis, Jr. | G06F 16/353 |
| 2019/0156256 A1* | 5/2019 | Argyros | G06F 40/216 |
| 2019/0171698 A1* | 6/2019 | Wang | G06F 40/143 |
| 2020/0104365 A1* | 4/2020 | Guo | G06Q 50/18 |
| 2020/0110839 A1* | 4/2020 | Wang | G06F 16/38 |
| 2020/0134757 A1* | 4/2020 | Raphael | G06F 16/9024 |
| 2020/0226510 A1* | 7/2020 | Gupta | G06Q 50/18 |
| 2020/0327151 A1* | 10/2020 | Coquard | G06F 16/3347 |
| 2020/0327172 A1* | 10/2020 | Coquard | G06V 30/416 |
| 2021/0209358 A1* | 7/2021 | Alikhani | G06V 30/416 |
| 2021/0374276 A1* | 12/2021 | Nayak | G06N 5/04 |

\* cited by examiner

GENERATING ACTIONABLE INFORMATION FROM DOCUMENTS

BACKGROUND

Enterprises, such as companies, create large amounts of documents during the normal course of business. These documents include legal documents, financial documents, manuals, guidelines and procedures, and many other types of content. Often, the documents include content that defines obligations or provisions for the enterprise or organization. For example, an enterprise can generate and/or be associated with different types of contracts that include many different provisions or obligations (e.g., a termination clause, certain contracted terms) for the enterprise and/or its subsidiaries.

Typically, the enterprise stores documents in various content management systems, perhaps grouping the documents by different fields (e.g., type, year, user, sub-group, and so on). The content management systems can facilitate the searching within these documents (e.g., by keyword), but often fail to provide users with scalable or efficient tools for accessing the content within the documents for use in workflows and other business processes performed by the enterprise, and often limit or prevent access to certain documents (or portions therein) to trusted or designated people, among other drawbacks.

Figure 1:
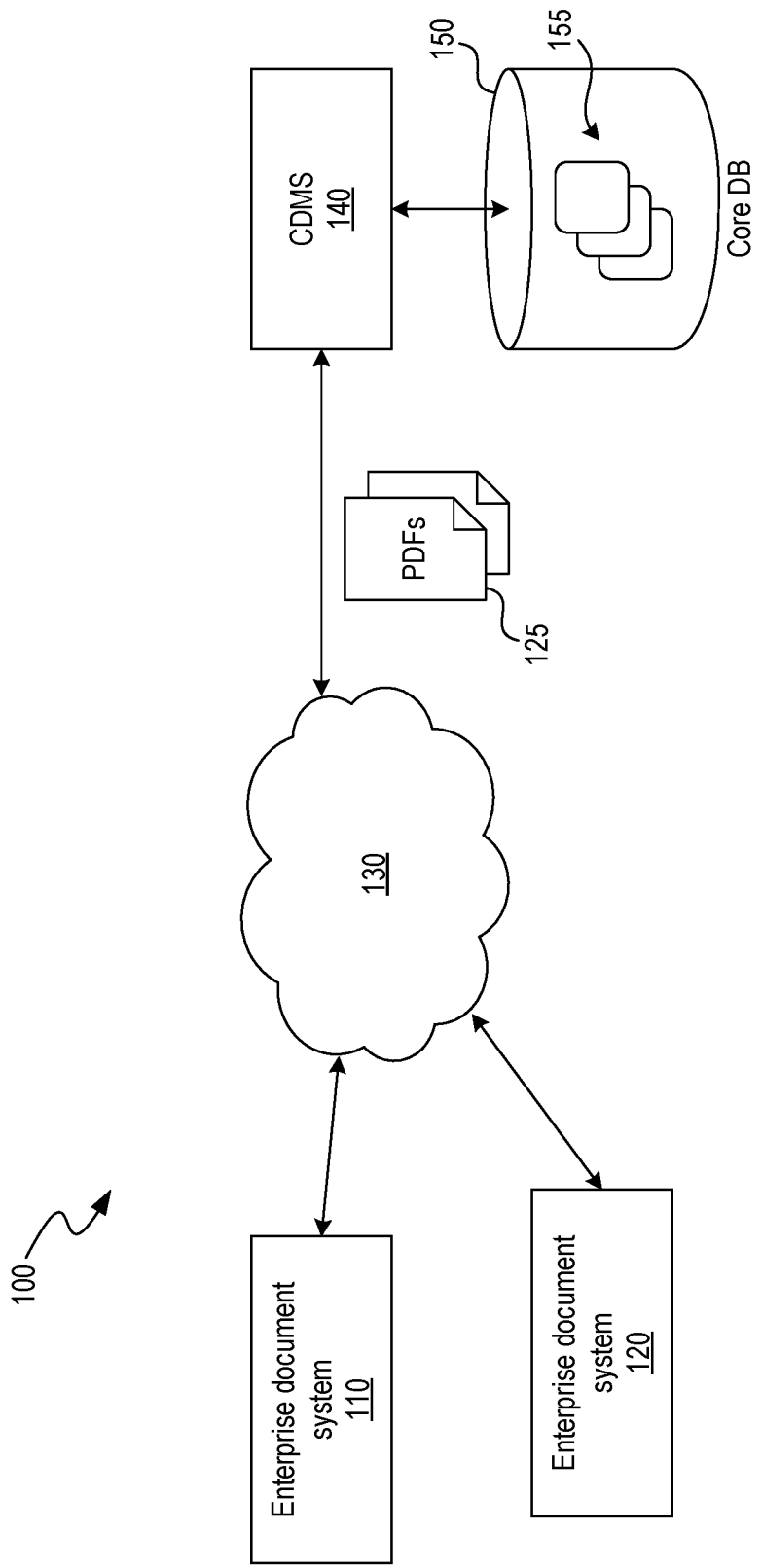
FIG. 1 is a block diagram illustrating a suitable computing environment that implements a Commitment Discovery and Management System (CDMS).

In the drawings, some components are not drawn to scale, and some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Overview

Systems and methods for creating actionable data from documents are described. In some implementations, the systems and methods deconstruct, or break up, documents into blocks (e.g., a paragraph or other segment or portion of text of the document), and store the blocks in a database, such as a graph database. The systems and methods tag the blocks with intelligence about the content of the blocks. For example, the systems and methods can tag blocks with commitment markers or other information that identify the blocks as containing or reciting a commitment (e.g., a contractual provision, term, or obligation) within a contract document. Thus, the graph database stores the blocks along with their relationships to other blocks, documents, parties, and so on, in an accessible format to other systems and processes.

Further, the systems and methods tie or associate the blocks to actions, such as actions performed by business processes of an enterprise or organization. Thus, the systems and methods create a graph database of actionable blocks extracted from documents created or managed by an enterprise or organization (and various parents or subsidiaries).

In some implementations, business processes, such as workflows, filters, or other actions, access the database of blocks and utilize the blocks when executing the processes. For example, a workflow can query for and identify blocks associated with a certain commitment or obligation, and extract documents associated with the blocks to provide to requesting systems.

Also, in some implementations, the systems and methods enable the filtering or selective provisioning of documents. For example, the systems and methods can reconstruct documents from blocks, and provide reconstructed documents to requesting systems without including certain types of data (e.g., privacy data) while verifying the documents are stored in a complete form. As another example, the systems and methods can inject consent blocks into reconstructed documents, enabling users to provide certain types of data (e.g., IoT data) to requesting systems along with consent information authorizing the systems access to the data. Thus, in various implementations, the systems and methods provide a database that maps document blocks to documents in order to provide users and systems with targeted access to information within the documents, among other benefits.

In the following description, for the purposes of explanation, numerous specific details are set forth in order to provide a thorough understanding of implementations of the present technology. It will be apparent, however, to one skilled in the art that implementations of the present technology can be practiced without some of these specific details. The phrases "in some implementations," "according to some implementations," "in the implementations shown," "in other implementations," and the like generally mean the particular feature, structure, or characteristic following the phrase is included in at least one implementation of the present technology and can be included in more than one implementation. In addition, such phrases do not necessarily refer to the same implementations or different implementations.

Examples of the Commitment Discovery and Management System (CDMS)

As described herein, the systems and methods facilitate the discovery and extraction of commitments from documents, such as legal contracts or other types of documents. In some cases, a commitment is a legal obligation defined in a document, such as a contractual clause or term (e.g., a merger clause, a termination clause, an indemnification clause, a privacy clause, a consent clause, and so on). For example, a commitment can define one or more agreements between parties as set forth in a contract. In other cases, a commitment can be generalized to include other types of agreements or obligations recited by a document. For example, a commitment can define instructions, procedures, or guidelines within a user manual or other document for an enterprise or organization.

FIG. 1 is a block diagram illustrating a suitable computing environment 100 that implements a Commitment Discovery and Management System (CDMS) 140. The CDMS 140, as described herein, performs various methods, functions, or processes for extracting blocks from documents, associating the blocks to actions, and storing the associated blocks within a database for an enterprise.

The CDMS 140, for example, receives documents 125 from an enterprise, such as from one or more enterprise document systems 110, 120 over a network 130. The enterprise, which may be a company, organization, or other entity, can facilitate access by the CDMS 140 to various document or data stores, such as databases of the document systems 110, 120. The CDMS 140, therefore, can import documents 125 in various digital forms (e.g., Word, pdf, and so on) from the document systems 110, 120.

Various enterprises can utilize the CDMS 140 when performing various business processes. Examples include: an insurance company that wishes to analyze insurance policies having different versions and in different languages, the review of distributor to audit supplier contracts, a large firm to audit delegation of powers, a global shopping mall operator to compare leasing agreements between its global clients, a bank to review a portfolio of loan, leasing or derivative agreements, a buyer of a company reviewing documents in a data room when performing diligence, a platform company or HR company processing employee contracts, an audit firm when analyzing documents, an airline company reviewing code share agreements with other airlines, a regulator reviewing documents of a company under supervision, a company reviewing operational manuals, a service provider on behalf of an individual, and so on.

The CDMS 140 performs various processes, as described herein, to identify, extract, and/or obtain "blocks" 155 from the documents received from the systems 110, 120. As used herein, in some embodiments, a document block, or block, refers to a portion of a document having contents that include a commitment or other phrase of agreement or obligation. Thus, a block is a portion of the contents of the document, and can refer to a paragraph, a sentence, a word, a number, and/or a character or character string within a document (this is different than a data block, which is a sequence of bits or bytes).

Once extracted, the CDMS 140 stores the document blocks 155 in a blocks database 150 associated with the CDMS 140. As described herein, the blocks database 150 is uniquely created by the CDMS 140 to maintain and manage documents as actionable objects for an enterprise. In some cases, the database 150 maps the blocks 155 to the documents 125 received from the document systems 110, 120 via a graph database. The database 150 can also store or map the blocks 155 in different groups of blocks, along with tags or associations that identify the blocks as being associated with a commitment or action, such as commitments or actions derived from contractual clause or other content within the documents 125.

Although not shown in FIG. 1, various business processes or other processes can access the CDMS 140 and/or associated database 150 when performing processes, such as workflows and other actions. A workflow, or other action, can be internal to an organization, or can span multiple organizations, or span subsidiaries sharing a common parent organization.

For example, a workflow process can query the database 150 for blocks 155 that satisfy certain query terms and return the blocks to the workflow process as input into the process. Thus, in some embodiments, the CDMS 140 enables selective utilization of the blocks 155 stored within the database 150 when requesting systems seek to perform actions using the contents of the documents 125, such as certain clauses within a contract or agreement, among other benefits. The CDMS 140 and associated database 150, therefore, enables the documents to be actionable.

FIG. 1 and the components depicted herein provide a general computing environment and network within which the CDMS 140 can be implemented. Further, the systems, methods, and techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical discs, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The network or cloud 130 can be any network, ranging from a wired or wireless local area network (LAN), to a wired or wireless wide area network (WAN), to the Internet or some other public or private network. While the connections between the CDMS 140 and the network 130 and database 150 are shown as separate connections, these connections can be any kind of local, wide area, wired, or wireless network, public or private.

Further, any or all components depicted in the Figures described herein can be supported and/or implemented via one or more computing systems or servers. Although not required, aspects of the various components or systems are described in the general context of computer-executable instructions, such as routines executed by a general-purpose computer, e.g., mobile device, a server computer, or personal computer. The system can be practiced with other communications, data processing, or computer system configurations, including: Internet appliances, wearable devices, AR/VR devices, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device"

and "handset" are generally used interchangeably herein and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system may reside on a server computer, while corresponding portions may reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Figure 2A:
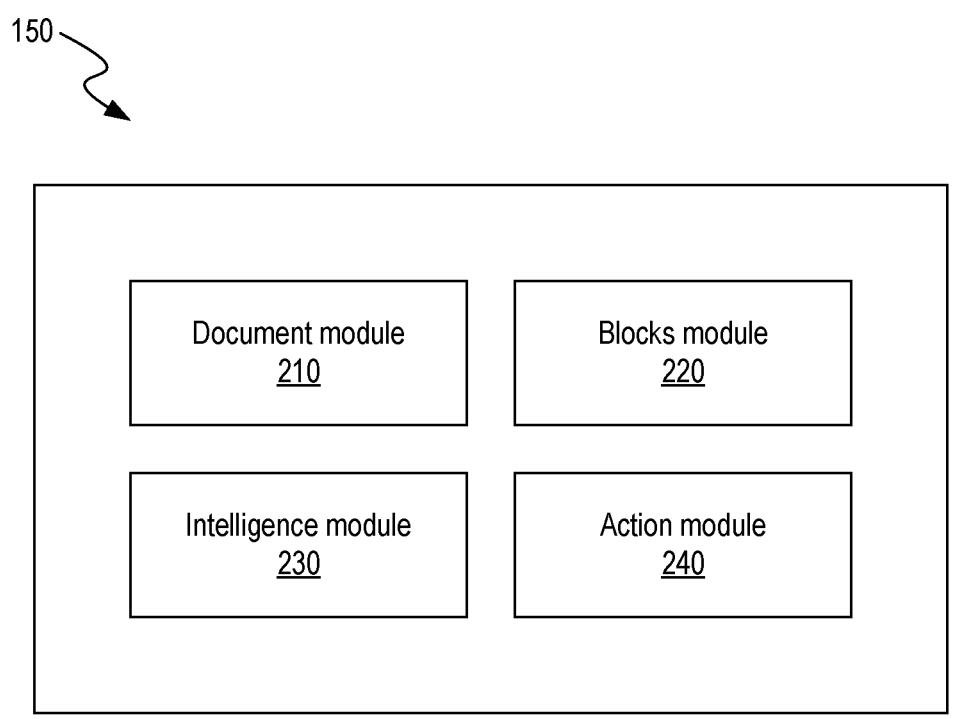
FIG. 2A is a block diagram illustrating various modules of the Commitment Discovery and Management System (CDMS).

FIG. 2A is a block diagram illustrating various modules of the Commitment Discovery and Management System (CDMS). The modules (or components) may be functional modules or engines that are implemented with a combination of software (e.g., executable instructions, or computer code) and hardware (e.g., at least a memory and processor). Accordingly, as used herein, in some examples a module or engine is a processor-implemented module or set of code and represents a computing device having a processor that is at least temporarily configured and/or programmed by executable instructions stored in memory to perform one or more of the particular functions that are described herein.

In some embodiments, the CDMS 140 includes a document module 210 that is configured and/or programmed to deconstruct documents into one or more blocks and store the multiple blocks in a database that relates the blocks to the multiple documents. For example, upon the CDMS 140 receiving the documents 125 from the systems 110, 120, the document module 210 captures portions of the documents 125 as blocks and stores the blocks 155 within the database 150.

For example, the document module 210 breaks a single document into blocks of text. The document becomes a collection or sum of independent blocks stored by the CDMS 140. The CDMS 140 can store a "reconstruction plan" within its data model, in order to reconstruct the source document (at a later time) the source document using the blocks 155 from the database 150 (e.g., to ensure or verify the document from the blocks).

In some embodiments, the CDMS 140 includes a blocks module 220 that is configured and/or programmed to associate multiple blocks into groups, wherein the groups of blocks are based on a topic or theme. For example, the blocks module 220 can group multiple blocks into a certain theme or topic associated with a commitment, which can be defined as a glossary of terms.

The blocks module 220, in some cases, maps documents having identical or substantially identical blocks. For example, two different documents can have an exact same paragraph or sentence, and hence share an identical block (e.g., an enterprise will often have the same choice of law clause in multiple sales agreement documents). In such cases, the blocks module 220 merges or combines the identical blocks into a unique semantic block (USB), which relates to the multiple distinct documents sharing the identical blocks. Thus, the blocks module 220 identifies documents sharing the same portions of content and merges the associated blocks within the database 150.

Therefore, the blocks module 220, by relating single unique semantic blocks to multiple documents, creates a first level of networking between documents managed by the CDMS 140. For example, the database 150 can include thousands of blocks, where each block is associated with one or more documents. Such associations provide a genealogy of the documents via their connections to the blocks.

In some embodiments, the CDMS 140 includes an intelligence module 230 that is configured and/or programmed to tag each of the multiple blocks with intelligence information. For example, the intelligence module 230 enables a user to tag blocks (or groups of blocks) with intelligence information provided by users (e.g., experts) or information determined by the system (e.g., via search information).

Figure 3:
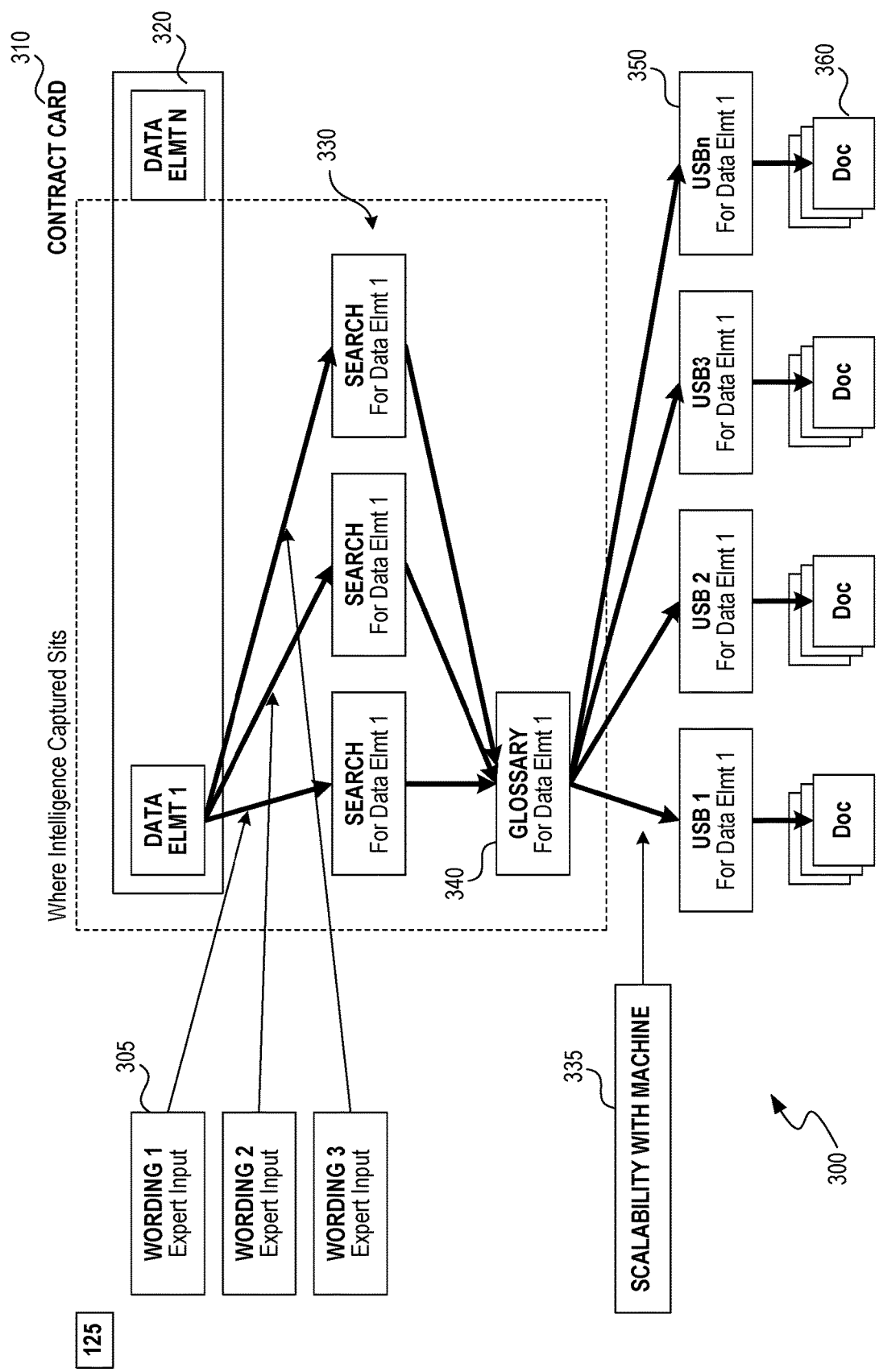
FIG. 3 is a block diagram illustrating a schema for tagging blocks with enterprise intelligence.

FIG. 3 is a block diagram illustrating a schema 300 for tagging blocks with enterprise intelligence. The schema 300 depicts a process flow where some or all processes described herein can be utilized by the intelligence module 230 when tagging blocks with intelligence information.

In some cases, an expert or other user can search for a specific topic in a document or batch of documents or tag the documents with certain topics or themes represented by the document or documents. In some cases, the system can determine, from searches or queries performed on the documents, what themes or topics are presented by the documents. Using the information determined by the expert searches or system (e.g., machine searches), the module 230 can tag associated blocks with intelligence information. The intelligence information can include a glossary, which contains three different types of information (e.g., a list of tags, parameters, and object attributes) for a block.

The following example project (or campaign) illustrates the tagging of blocks to intelligence information. A user has a project to extract data fields XYZ (e.g., "product line") from a batch of documents. The user provides a contract card 310, which identifies the data fields XYZ to be searched for, where a single data field is a data element 320 to the system. The contract card 310 also identifies a batch of documents to search (a campaign batch).

Experts propose different wordings 305 to search within the campaign batch, in order to filter blocks and access the information within the blocks. Because there are many different types of documents (as well as different versions of the same document or documents), the expert wordings 305 can include many different variations.

Next, the module 230 performs searches 330 using the different wordings for the data element 320 identified by the contract card 310. The module 230 generates a glossary 340, which is a tag or parameter related to the data element 320. For example, for the data element 320: N searches are performed leading to 1 tag (with sub-tags, parameters, and/or object attributes also associated with the data element). The glossary 340 includes tags related to blocks that match one of the searches. (e.g., one glossary tag can map to N unique semantic blocks 350). Given that one USB 350 can relate to multiple documents (or records) 360 of the database 150, the glossary 340 can relate to the various documents 360 connected to the glossary 340 via their shared USBs 350.

The following process illustrates use of the schema 300. First, an expert proposes a search wording to find one block that relates to the data element 1. Once the block is found, the expert can confirm the block found actually captures the data elements 1 and creates a "Data Element 1 Commitment Marker." The machine, or system, then finds all the similar blocks in the database and tags them with the same "Data Element 1 Commitment Marker." If documents remain untagged, the expert proposes a new search to find other blocks that relate to the data element 1. Once found, the expert confirms the second block found actually includes the data elements 1. Again, the machine, or system, then finds all the similar blocks in the database and tags them all with the same "Data Element 1 Commitment Marker." The expert performs the iteration until all contracts are tagged for the data element 1. Once all documents are tagged, the system has captured the "Expert Intelligence" and associates blocks with a triplet of information (e.g., data element; N searches, and commitment markers), as well as associates the documents to the information via the blocks.

In some cases, the jobs are performed according to the following allocation of resources:

An expert initiates the work, including defining an initial contract card and Initial commitment markers; then the machine brings scale with iterations for each search. Most of the volume of documents (e.g., 70% volume) are easily handled, with a small amount (e.g., 25% volume) using additional input from an expert, and a few exceptional cases (e.g., 5% volume).

In many cases, data elements do not require review from experts, and normal users within an enterprise can review and provide wordings. In some cases, the system utilizes experts in different languages to run queries in their languages. Also, experts may associate blocks to actions when proposing wordings or searches for blocks.

In some cases (e.g., the exceptional cases identified herein), the system identifies blocks or documents that are not tagged after the queries are performed with the different wordings. In such cases, an expert or the system can manually tag the block or document with commitment markers or can leave the block or document untagged.

The module 230 performs the same process for all data elements (e.g., fields) identified by the contract card 310. Thus, once the campaign ends, the module 230 can capture intelligence from users (experts) and machines, enabling the CDMS 140 to associate blocks with information triplets (e.g., data element, searches, glossary or commitment marker).

Further, once a campaign is utilized to tag blocks within the database 150, the intelligence module 230 can complement the known intelligence when performing additional searches. Further, when new documents are imported into the CDMS 140, the module 230 can determine the new documents include blocks similar to those known to the CDMS 140 and automatically merge and tag the blocks.

Also, the intelligence module 230 can perform the processes described herein with documents in different languages, performing searches in the respective languages and connecting the searches to the same data elements, regardless of the original language of the document containing the data element.

In some cases, the CDMS 140 performs the extraction of blocks and tagging of blocks within a temporary database, before storing the blocks within the database 150. For example, the CDMS 140, upon receiving the documents 125, stores the documents 125 in the database 150 while tagging the blocks in the temporary database. The CDMD 140 can thus pre-process by automatically tagging the USBs using information determined when qualifying data for other documents managed by the system. As an example, given a data element of "category of document," the CDMS 140 utilizes information determined from previous searches (e.g., commitment markers) to tag content within new documents, which automatically identifies a category for a document newly imported to the system.

Once the blocks are tagged with the intelligence information, the CDMS 140 stores the blocks (mapped to the documents 125) within the database 150.

As described herein, the database 150 stores blocks and documents as a graph database, where nodes represent blocks (and related text), documents, and parties, and edges represent relationships between blocks and documents or parties (or other blocks). Thus, using a graph database to store data in the database 150, the CDMS 140 can store relationship information between documents when the documents share a common block. Thus, a node representing a block can link to multiple different documents via edges within the graph, as well as a document linking to multiple blocks.

Figure 2B:
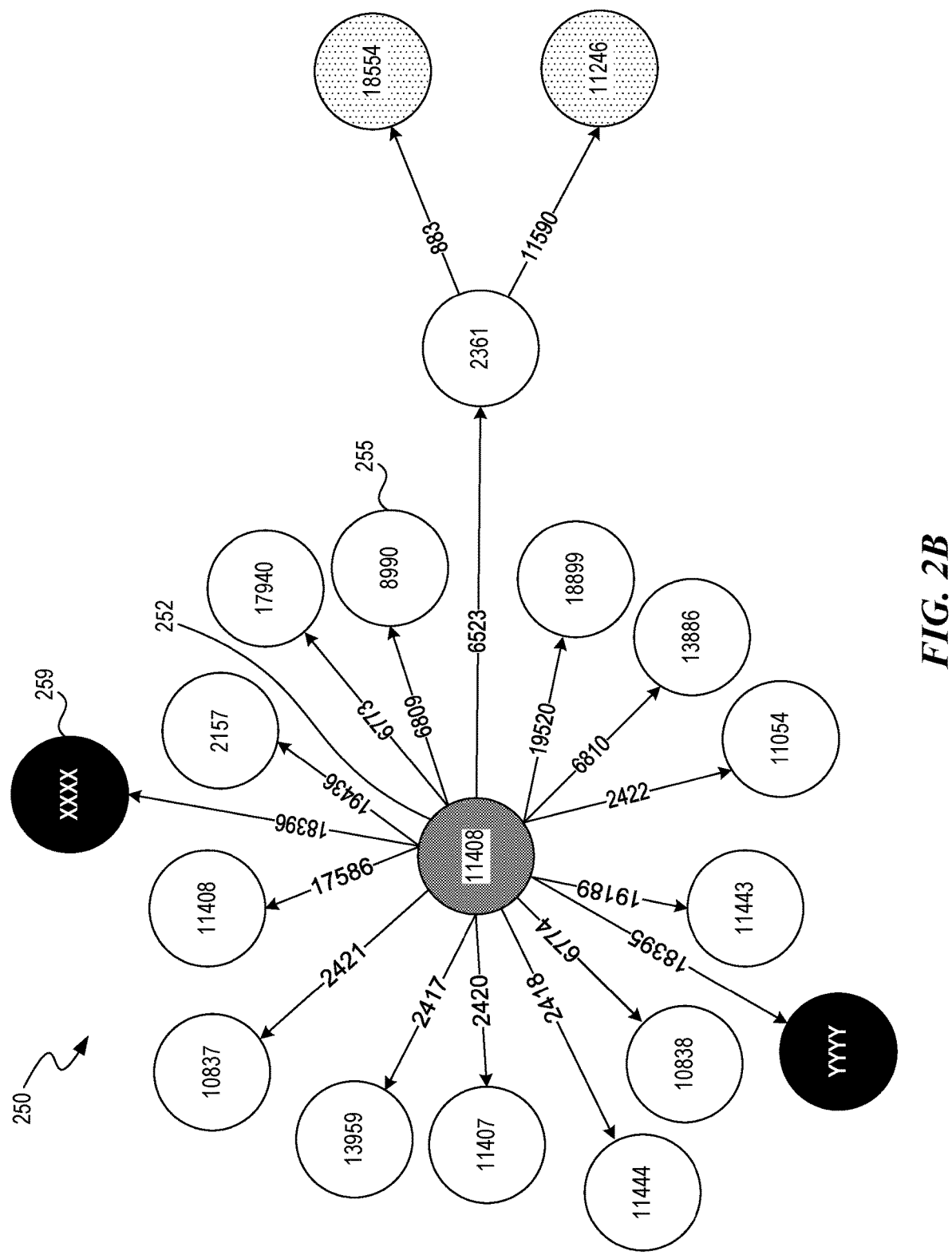
FIG. 2B is a diagram illustrating an example graph database 250 representing relationships between documents and blocks.

FIG. 2B is a diagram illustrating an example graph database 250 representing relationships between documents and blocks. As depicted, the graph 250 represents a document as a node 252 having many different edges that connect to nodes 255 representing blocks 255. The graph 250 also represents parties as nodes 259 and can store information related to each block within nodes 257 (e.g., the text of a specific contractual provision associated with the block). Thus, using the graph database 250, the CDMS 140 can run or perform queries or searches to identify documents related to one another via common blocks, common parties, and so on. Referring back to FIG. 2A, the intelligence module 230 can perform various processes (e.g., manual or automatic) to tag the blocks with information triplets that identify data elements, searches, and glossary information for the blocks.

In some embodiments, the CDMS 140 includes an action module 240 that is configured and/or programmed to tie, connect, or associate each of the multiple blocks to an action. An action, as described herein, includes processes performed using a block (and/or information tagged with the block) as input.

The CDMS 140 tags the blocks 155 with commitment markers, such as indicia that identify a commitment or commitments associated with the block. The commitment markers, similar to the tags described herein enable the database 150 to facilitate queries for blocks that share or are associated with a commitment being searched for by a user. For example, certain processes (e.g., audit or compliance reviews, reporting, data rooms, post-merger integrations, and other reviews of large batches of documents) can benefit from querying the database 150 to identify blocks associated with certain commitment markers, enabling users to quickly and accurately identify documents of interest via blocks related to the documents.

Further, the CDMS 140 can provide such information associated with the document blocks 155 within the database 150 as input into various requesting systems or business processes (e.g., Business Intelligence processes or workflows). Example systems include Enterprise Resource Planning (ERP) systems, Customer Relationship Management (CRM) systems, accounting systems, calendar systems, chatbots and other customer interface systems, messaging systems, and so on.

Further, the CDMS 140 can use a block and associated commitment marker when calling the executing of code. For example, an executable smart contract (e.g., via Ethereum or other open source block chain or distributed platform) can receive a block as input and execute the smart contract via the block (or information tagged to the block).

In addition, the CDMS 140 can perform actions to execute portions of a contract using blocks (and associated information) as input. For example, given a workflow that performs an action to execute a provision on a periodic basis (e.g., every year for the life of an agreement), the CDMS 140 facilitates the execution of the provision via the workflow by providing the workflow with access to the block tagged with commitment markers for the commitment associated with the provision to be executed.

As described herein, the CDMS 140 represents a commitment as a set of parameters, tags, and object attributes. This information is stored in the data model at the level of the blocks 155 within the database 150 and are based on commitment markers. The CDMS 140 performs various actions for a commitment, such as code execution (e.g., the block associated with the commitment being input to a library of code), filtering (e.g., documents are filtered based on blocks), and/or workflows (e.g., blocks are input to workflows, as described herein).

Thus, when actions are performed, the associated blocks utilized during the performance of the actions are tagged with the performed actions. In doing so, the CDMS 140 relates the action to the document associated with the block, enabling the system to provide the document when requested (e.g., the CDMS 140 can provide proof that the block used within the action is part of a legally binding or otherwise legitimate document).

The CDMS 140, therefore, can perform many different processes using the database 150 of document blocks 155, including commitment extraction processes that add commitment markers in order to query the database 150 for blocks (and related documents) containing a searched for commitment, and commitment management processes that utilize blocks to trigger the performance of actions.

Figure 4:
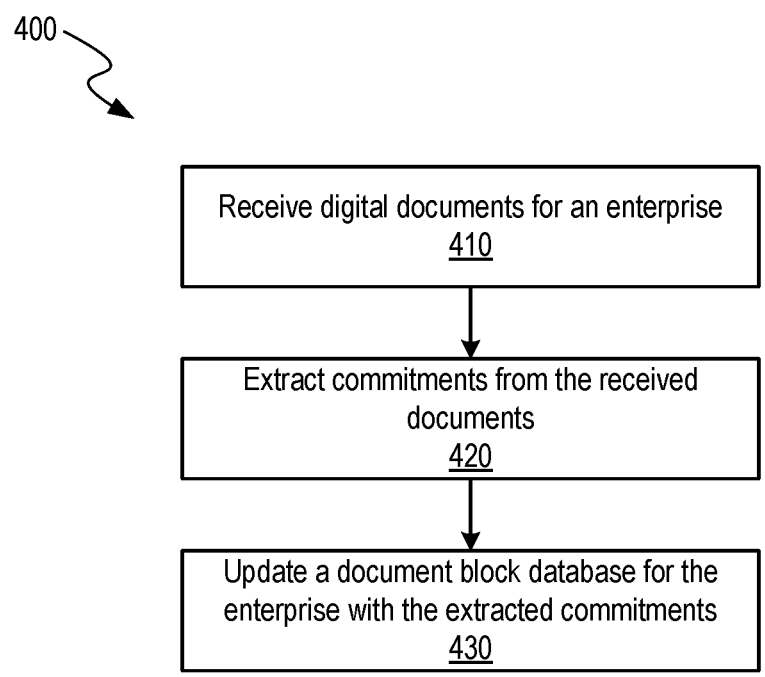
FIG. 4 is a flow diagram illustrating a method for generating a database of commitments for an enterprise.

As described herein, the CDMS 140 enables an enterprise to perform various actions via a database of commitments, represented by tagged blocks, within documents of the enterprise. FIG. 4 is a flow diagram illustrating a method 400 for generating a database of commitments for an enterprise. The method 400 may be performed by the CDMS 140 and, accordingly, is described herein merely by way of reference thereto. It will be appreciated that the method 400 may be performed on any suitable hardware.

In operation 410, the CDMS 140 receives a batch of documents for an enterprise. For example, the CDMS 140, via the document module 210, receives a batch of legal contracts in pdf form from the enterprise document system 110. The legal contracts can include various commitments, such as obligations, provisions, clauses or other agreements between parties identified within the contracts.

In operation 420, the CDMS 140 extracts commitments from the received documents. For example, the document module 210 breaks the documents up into blocks, where each block is associated with a commitment. The CDMS 140 can then group the blocks, identify common blocks and merge the common blocks into unique semantic blocks, and associate the blocks with glossary terms (as described herein).

In operation 430, the CDMS 140 updates a document block database with the extracted commitments. For example, after the intelligence module 230 tags the blocks with glossary tags, the document module 210 stores the tagged blocks as commitments within the database 150 as tagged blocks 155. Thus, the CDMS 140 represents the documents received by the system as tagged blocks within a unique database that relates commitments (or tagged blocks) to the documents (and to performed actions).

Figure 5:
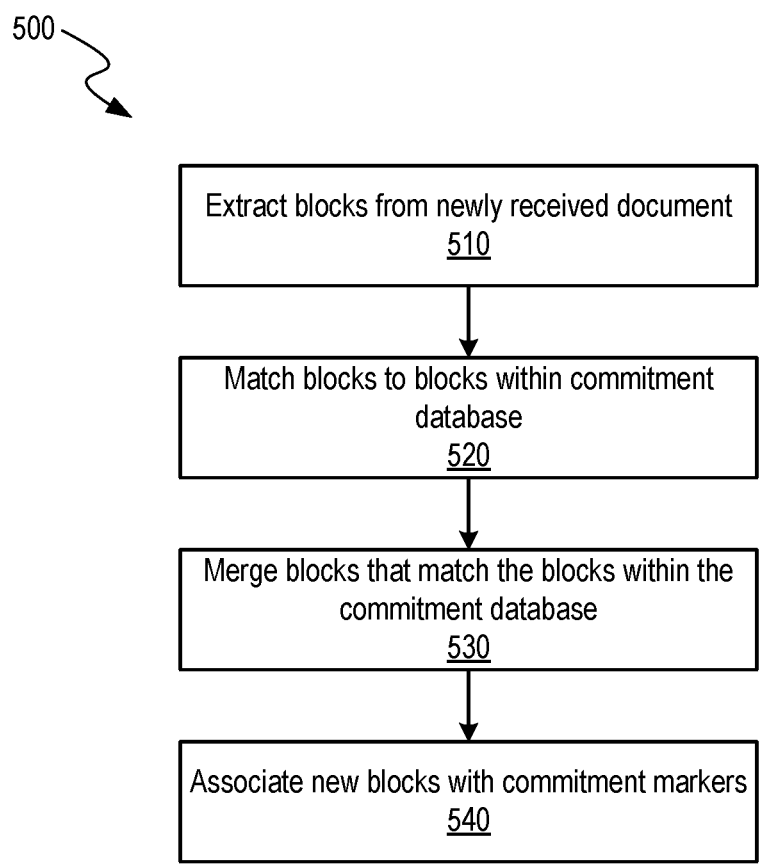
FIG. 5 is a flow diagram illustrating a method for automatically extracting commitments from a document.

As described herein, the CDMS 140 can quickly and efficiently manage newly added documents by utilizing or leveraging previous intelligence extraction and tagging to blocks within the database 150. FIG. 5 is a flow diagram illustrating a method 500 for automatically extracting commitments from a new document. The method 500 may be performed by the CDMS 140 and, accordingly, is described herein merely by way of reference thereto. It will be appreciated that the method 500 may be performed on any suitable hardware.

In operation 510, the CDMS 140 receives or extracts blocks from the newly received document. For example, the document module 210 breaks the newly received document up and captures portions of the new document as blocks.

In operation 520, the CDMS 140 matches the extracted blocks to known blocks within the database. For example, the blocks module 220 matches blocks from the new document to blocks 155 stored within the database 150.

In operation 530, when a block from the new document matches a stored block, the CDMS 140 merges the blocks. For example, the blocks module 220 merges the block from the new document to a unique semantic block stored within the database 150. In doing so, the CDMS 140 maps the new document to the merged block.

In operation 540, the CDMS 140 associates the new blocks with commitment markers. For example, when merging the blocks, the intelligence module 230 tags the blocks with commitment markers associated with the merged blocks in the database 150. Thus, the CDMS 140 leverages the previous tagging efforts to tag new blocks to the database with commitment markers (e.g., glossary information) when storing the blocks to the database.

Example Use Cases for the Commitment Discovery and Management System (CDMS)

Figure 6:
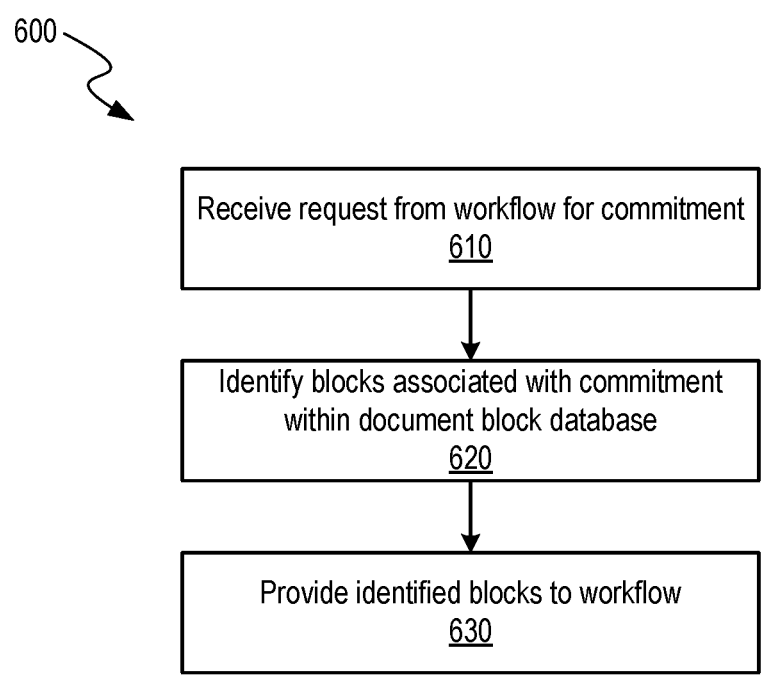
FIG. 6 is a flow diagram illustrating a method for performing actions using blocks associated with documents.

As described herein, the CDMS 140 can provide blocks and associated information to various business processes or actions for an enterprise. FIG. 6 is a flow diagram illustrating a method 600 for performing actions using blocks associated with documents. The method 600 may be performed by the CDMS 140 and, accordingly, is described herein merely by way of reference thereto. It will be appreciated that the method 600 may be performed on any suitable hardware.

In operation 610, the CDMS 140 receives a request from a workflow process for documents containing a commitment. For example, the CDMS 140 receives a request from an enterprise workflow process to provide documents having a certain insurance clause within their contents.

In operation 620, the CDMS 140 identifies documents blocks within a document block database that are associated with the requested commitment. For example, the CDMS 140 queries the database 150 for blocks tagged with commitment markers associated with the certain insurance clause and identifies blocks that satisfy the query.

In operation 630, the CDMS 140 provides the identified document blocks to the workflow. For example, the CDMS 140 enables the workflow to perform an action by accessing the identified blocks in order to identify and obtain documents mapped to the blocks. Thus, the workflow identifies all documents having the certain clause without having to manually review all documents, and instead utilizing or leveraging the document block database 150 and the blocks 155 stored therein.

Typically, in such a scenario, an expert will have to sequentially review one document after another. For large batches of documents, this review can take days, if not weeks or months of time. The CDMS 140, however, enables the review of documents via data elements (e.g., fields or commitments) across all documents via the document block database 150. Such review can be faster, more efficient, and more accurate.

Thus, the CDMS 140 can provide high quality and accuracy of review, can apply economies of scale, is exhaustive, where the database includes 100% of the content of the document (e.g., the document can be rebuilt from the database components), saves expert time and expense, provides traceability, consistency, and agility (e.g., can add new data elements during the review), among other benefits.

Thus, it follows that many different use cases can leverage the processes described herein and performed by the CDMS 140. Some examples include:

Audits: For Finance, Compliance, Forensic, and so on, including Intra-company search, Intra-group search, and Across silos search;

Decision Making: Bench marking terms across (ex: between supplier X & Y), Spotting trends, Post M&A integration follow up;

Visualization: to benchmark contracts across versions, silos, languages;

Artificial Intelligence (AI) Systems;

Feed into CRM;

Production system; access to an existing DB;

E-Signature integration (E-signed docs automatically updated in the DB in real time);

Chatbots and other customer interface systems;

Blockchain and Smart Contract integration;

Machine to Machine data exchange;

Verticals;

Consumer Service (ex: insurance comparisons between users);

Messaging for collaboration contracts;

Privacy: interface to manage consents, for access to data based on authorization on who can see, read, and share; and others.

In addition to the use cases described herein, the CDMS 140 can facilitate the integration of consent and data access for users of Internet of Things (IoT) devices and other data capture devices. For example, a user may wish to provide biological data (e.g., heart rate data) captured by her smart watch to her doctor, but access to the data is governed by the user contract between the user and the company that sold her the smart watch.

However, using the CDMS 140, the user could identify a commitment to be applied to data captured by the smart watch (e.g., a consent clause that authorized the doctor to access the heart rate data captured by the smart watch). The CDMS 140 can capture the commitment as described herein, and facilitate machine to machine (e.g., smart watch to doctor's servers) exchanges of the data using the actions described herein.

Figure 7:
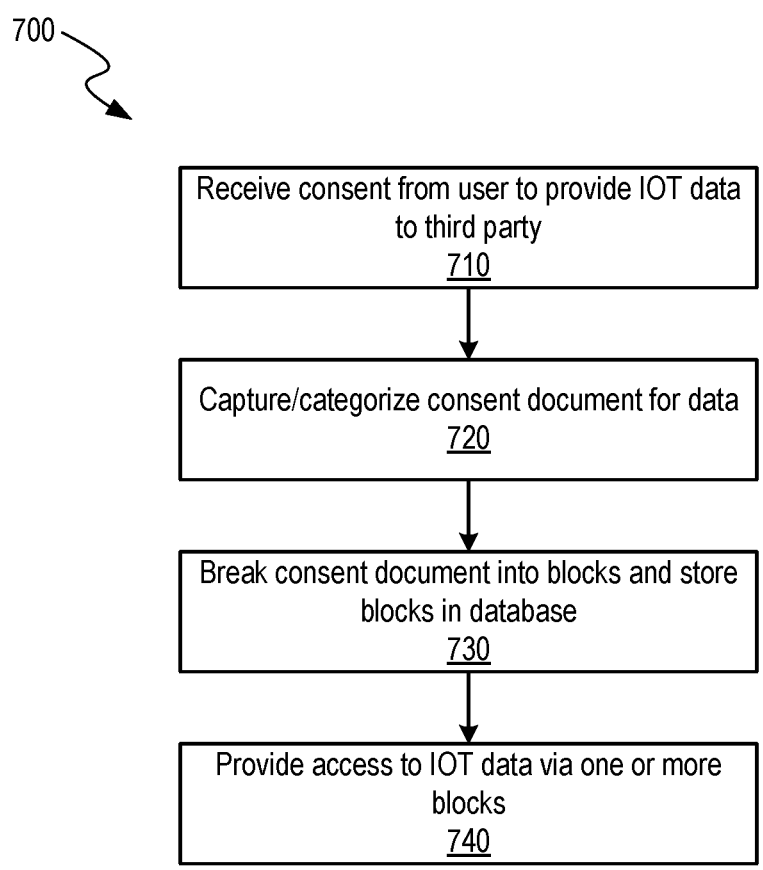
FIG. 7 is a flow diagram illustrating a method for managing Internet of Things (IoT) data for a user.

FIG. 7 is a flow diagram illustrating a method 700 for managing Internet of Things (IoT) data for a user. The method 700 may be performed by the CDMS 140 and, accordingly, is described herein merely by way of reference thereto. It will be appreciated that the method 700 may be performed on any suitable hardware.

In operation 710, the CDMS 140 receives an indication from a user authorize a third party to access data captured or generated by an IoT device. For example, the user identifies one or more fields or types of data to provide to the third party (e.g., a doctor or trainer).

In operation 720, the CDMS 140 captures and/or categorizes a consent document that identifies the party given consent by the user and the data to be provided to the party.

In operation 730, the CDMS 140 stores multiple blocks in the database that represent the generated consent document. For example, the blocks relate to different forms of consent or types of data authorized to be accessed by the third party.

In operation 740, the CDMS 140 provides the third party with access to the data. In some cases, the CDMS 140 can provide access via the blocks associated with the data to be provided to the third party, in order to facilitate a machine to machine exchange of data that is governed by the consent document. In some cases, the CDMS 140 verifies the third party, and only provides data associated with blocks tagged with commitment markers for the data. Thus, the CDMS 140 filters out any other data, preventing the third party from accessing data not consented to by the user.

As described herein, the CDMS 140 can manage the filtering of data, enabling enterprises to provide documents to requesting systems without exposing sensitive or private user information, such as information governed by GDPR (General Data Protection Regulation) and similar data protection and privacy regimes.

In building and maintaining a database of document blocks for an enterprise, the CDMS 140 provides for the management of documents at a granular level. For example, the CDMS 140 can respond to queries for documents by reconstructing the documents using their associated blocks, without including private information not needed by a requesting system. The CDMS 140 can also certify the document as authentic despite the absence of privacy information in the reconstructed version.

Figure 8:
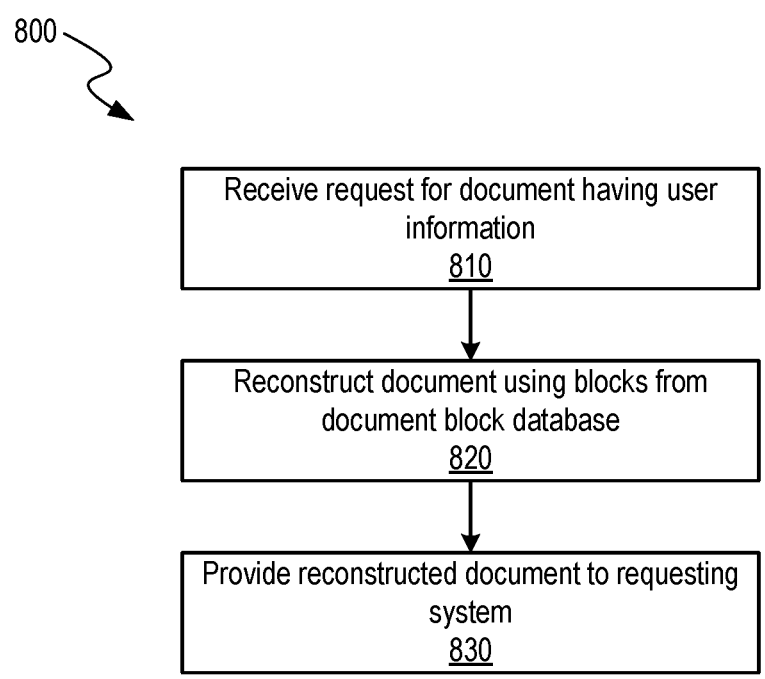
FIG. 8 is a flow diagram illustrating a method for providing documents to requesting systems using privacy filters.

FIG. 8 is a flow diagram illustrating a method 800 for providing documents to requesting systems using privacy filters. The method 800 may be performed by the CDMS 140 and, accordingly, is described herein merely by way of reference thereto. It will be appreciated that the method 800 may be performed on any suitable hardware.

In operation 810, the CDMS 140 receives a request to provide a document stored within the database. For example, the requested document is a home insurance document for a user and has been requested to determine whether the document includes a current arbitration clause.

In operation 820, the CDMS 140 reconstructs the document using blocks stored in a document block database. For example, the CDMS 140 accesses the database 150 and identifies the blocks associated with the requested document. While reconstructing the document, the CDMS 140 can filter out unnecessary biographical information for the user, such as by not including certain blocks associated with the information and/or augmenting certain data elements with XXXXXX or other obfuscation markings.

In operation 830, the CDMS 140 provides the reconstructed document to the requesting system. Thus, the CDMS 140, in some cases, can facilitate the retrieval and provision of documents having sensitive or private information removed or obfuscated. Further, the CDMS 140 can facilitate the editing of information and/or deletion of information stored within the database 150.

In some embodiments, the CDMS 140 facilitates various other uses of the document block database. For example, the CDMS 140 can provide reports or data visualizations, enabling users to benchmark their legal contracts and other documents across other enterprises (e.g., the system can assign grades to blocks for a specific data element or commitment, providing a qualitative assessment of the language within the block). Thus, the system can facilitate the comparison of similar blocks across contracts and other documents on a local and/or global scale, enabling enterprises to identify issues within their documents and make improvements. The system can present various visualizations that reflect changes over time for blocks or data elements. These visualizations can include heat maps, radar or spider charts, and other data visualizations.

Figure 9:
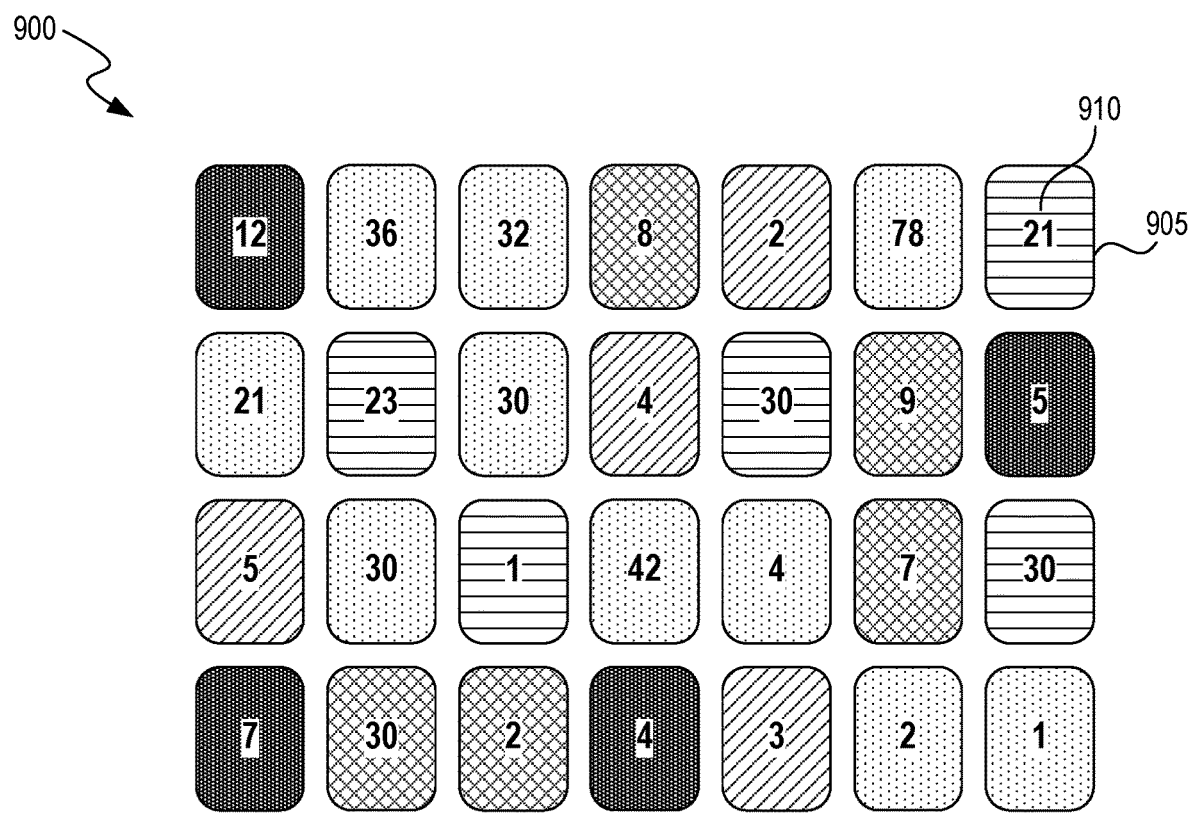
FIG. 9 is a diagram illustrating an example topic-based view of all contracts managed by the system.

For example, FIG. 9 depicts an example topic-based view 900 of some or all contracts managed by the CDMS 140. As depicted, each box 905 represents a specific wording for a topic (e.g., a contractual clause, such as a rent provision). Each number 910 represents the number of documents that include the specific wording. Thus, the CDMS 140, via the topic-based view, provides information that illustrates how a certain clause is represented, as well as a number of associated documents, for all documents within the CDMS 140.

Figure 10:
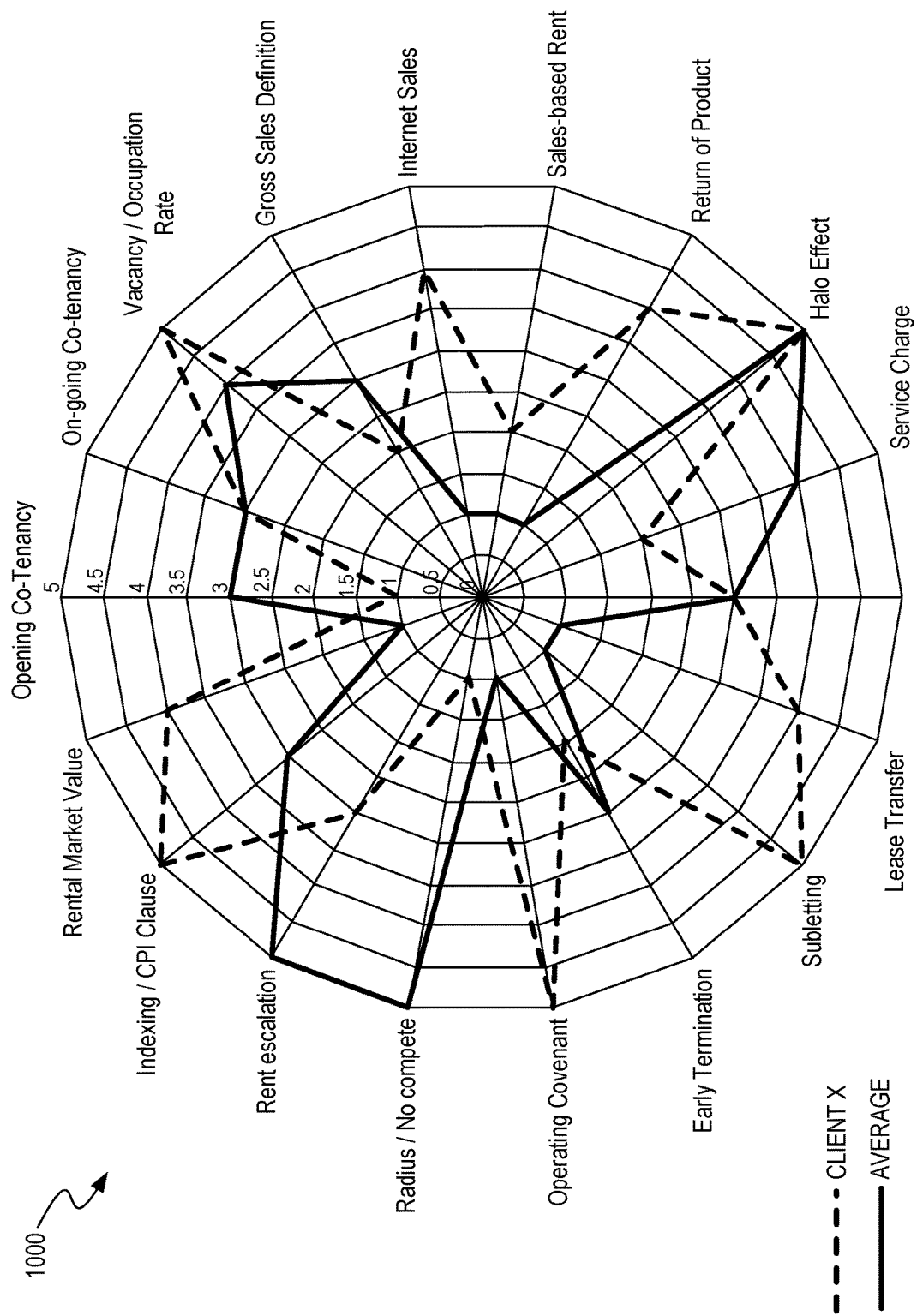
FIG. 10 is a diagram illustrating an example radar chart for contracts managed by the system.

As another example, FIG. 10 illustrates an example radar or spider chart used to compare documents managed by the CDMS 140. As depicted, the CDMS 140 can generate or present the chart for a specific enterprise, giving the enterprise insight into how its contractual language compares with others managed by the CDMS 140.

In some embodiments, the CDMS 140 facilitates changes or amendments to documents. As described herein, the CDMS 140 manages documents as blocks, and thus can add or augment blocks to the database and link these blocks to the stored contract. Thus, a virtual contract is represented by the system as a collection or group of blocks, where some blocks represent the initial contract and new blocks represent additions to the contract. The system can include rules of reconstruction (e.g., a graph database) that instruct the overriding of old blocks with new blocks that includes the changes to the contract.

Further, blocks can represent or identify relationships between contract and master agreements. The database 150 includes blocks that reflect amendments to a contract. Thus, the amended contract can be readable by a human (e.g., the actual contract and amendments) and a machine (e.g., the representative blocks). The database of blocks, then, provides a source of truth for human-machine relationships.

For example, a chatbot or other automated machine interface can query the database for commitments. Because the CDMS 140 stores documents as blocks, the CDMS 140 can respond to the query. The CDMS 140 can then provide authorization to the data, provide suggested changes to the data (e.g., filters or amendments) and so on. Thus, the CDMS 140 can manage requests from chatbots via the database of blocks without providing private or unauthorized responses.

Because a chatbot acts as an interface to interact with commitments, it can query the commitments and return specific answers, with or without personal or otherwise confidential data. Via the interactions, the chatbot can modify the commitments (e.g., extend my insurance policy by term or scope) by applying various rules mechanisms.

Further, the CDMS 140 can manage the provision of services for an enterprise. Because all services having an underlying agreement or contract, the system can manage use of the services via the document block database, which includes documents in human and machine-readable formats. For example, given terms of contracts, the system can facilitate a user modifying her customer profile for different service providers. The user, then, can clarify who can access what, and update associated commitments (e.g., change doctor access, enable access to other information, and so on).

As another example, the CDMS 140 can assist with the classification or naming (renaming) of documents. Enterprises store large numbers of documents, especially enterprises with multiple departments (e.g., accounts, human resources, legal, and so on). Often, these enterprises utilize many different naming conventions when classifying or naming documents stored on their servers.

Using the CDMS 140, an enterprise can classify documents without relying on the names of the documents, thus avoiding issues associated with the disparate names on similar documents. For example, when classifying certain types of documents, the CDMS 140 can retrieve all documents that share a common block or blocks, greatly reducing the set of documents for classification, without sacrificing the precision of the document retrieval.

Thus, in some embodiments, the CDMS 140 provides various benefits to systems and services that utilize human-machine interfaces, because the retention of documents into blocks enables the system to be a source of truth for the documents when accessed by machines.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks, or employ systems having blocks, in a different order; and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the methods and system provided herein can be applied to other systems, not necessarily the system described above. The elements, blocks and acts of the various implementations described above can be combined to provide further implementations.

Any patents, applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

We claim:

1. A system for generating actionable documents for an enterprise, the system comprising:
multiple hardware modules executable by a processor, the multiple hardware modules including:
a document module that:
receives multiple documents from one or more document systems of the enterprise;
deconstructs the multiple documents into multiple blocks,
wherein a block includes a segment of text within a document; and
stores the multiple blocks in a database that relates the blocks to the multiple documents;
a blocks module that associates the multiple blocks into groups,
wherein the groups of blocks are associated with a commitment, and
wherein a commitment is a provision recited within the documents;
an intelligence module that:
tags each of the multiple blocks with intelligence information,
wherein the intelligence information includes data element information, information associated with searches of the multiple blocks performed by experts, and commitment markers assigned to the multiple blocks; and
stores the multiple blocks in the database along with the tagged intelligence information as commitments within the database; and
an action module that associates each of the multiple blocks to an action performed by a business process of the enterprise.

2. The system of claim 1, wherein the blocks module in configured to merge identical blocks into a single unique semantic block and store the unique semantic block in the database in place of the merged identical blocks.

3. The system of claim 1, wherein the multiple documents are legal contracts associated with the enterprise, and the commitment is a specific contractual clause within the legal contracts.

4. The system of claim 1, wherein the multiple documents are legal contracts associated with the enterprise.

5. The system of claim 1, wherein the multiple documents are received as pdf documents.

6. The system of claim 1, wherein the intelligence module tags each of the multiple blocks with intelligence information by identifying blocks of the multiple blocks that include search wordings received from the experts and identifying similar blocks of the multiple blocks that include the search wordings.

7. The system of claim 1, wherein the document module is configured to reconstruct the multiple documents using the multiple blocks stored in the database.

8. The system of claim 1, wherein the intelligence information includes glossary information that includes terms defining the commitment associated with the multiple blocks.

9. The system of claim 1, wherein the action performed by a business process of the enterprise includes a filtering process performed by the enterprise.

10. The system of claim 1, wherein the action performed by a business process of the enterprise includes a business workflow that receives a block as an input.

11. The system of claim 1, wherein the action performed by a business process of the enterprise includes a smart contract that uses at least one block stored within the database when executing provisions of the smart contract.

12. A computer-implemented method for generating actionable documents for an enterprise, the method comprising:
receiving multiple documents from one or more document systems of the enterprise;
deconstructing the multiple documents into multiple blocks,
wherein a block includes a segment of text within a document;
storing the multiple blocks in a database that relates the blocks to the multiple documents;
associating the multiple blocks into groups, wherein the groups of blocks are associated with a commitment, and
wherein a commitment is a provision recited within the documents;
tagging each of the multiple blocks with intelligence information,
wherein the intelligence information includes data element information, information associated with searches of the multiple blocks performed by experts, and commitment markers assigned to the multiple blocks;
storing the multiple blocks in the database along with the tagged intelligence information as commitments within the database; and
associating each of the multiple blocks to an action performed by a business process of the enterprise.

13. The method of claim 12, further comprising:
merging identical blocks into a single unique semantic block; and
storing the unique semantic block in the database in place of the merged identical blocks.

14. The method of claim 12, wherein the multiple documents are legal contracts associated with the enterprise, and the commitment is a specific contractual clause within the legal contracts.

15. The method of claim 12, wherein the multiple documents are legal contracts associated with the enterprise.

16. The method of claim 12, wherein the multiple documents are received as pdf documents.

17. A non-transitory, computer-readable medium whose contents, when executed by a computing system, cause the computing system to perform a method for generating actionable documents for an enterprise, the method comprising:
receiving multiple documents from one or more document systems of the enterprise;
deconstructing the multiple documents into multiple blocks,
wherein a block includes a segment of text within a document;
storing the multiple blocks in a database that relates the blocks to the multiple documents;
associating the multiple blocks into groups,
wherein the groups of blocks are associated with a commitment, and
wherein a commitment is a provision recited within the documents;
tagging each of the multiple blocks with intelligence information,
wherein the intelligence information includes data element information, information associated with searches of the multiple blocks performed by experts, and commitment markers assigned to the multiple blocks;
storing the multiple blocks in the database along with the tagged intelligence information as commitments within the database; and
associating each of the multiple blocks to an action performed by a business process of the enterprise.

18. The non-transitory, computer-readable medium of claim 17, further comprising:
merging identical blocks into a single unique semantic block; and
storing the unique semantic block in the database in place of the merged identical blocks.

19. The non-transitory, computer-readable medium of claim 17, wherein the multiple documents are legal contracts associated with the enterprise.

20. The non-transitory, computer-readable medium of claim 17, wherein the multiple documents are received as pdf documents.

* * * * *